Figures 1, 2:
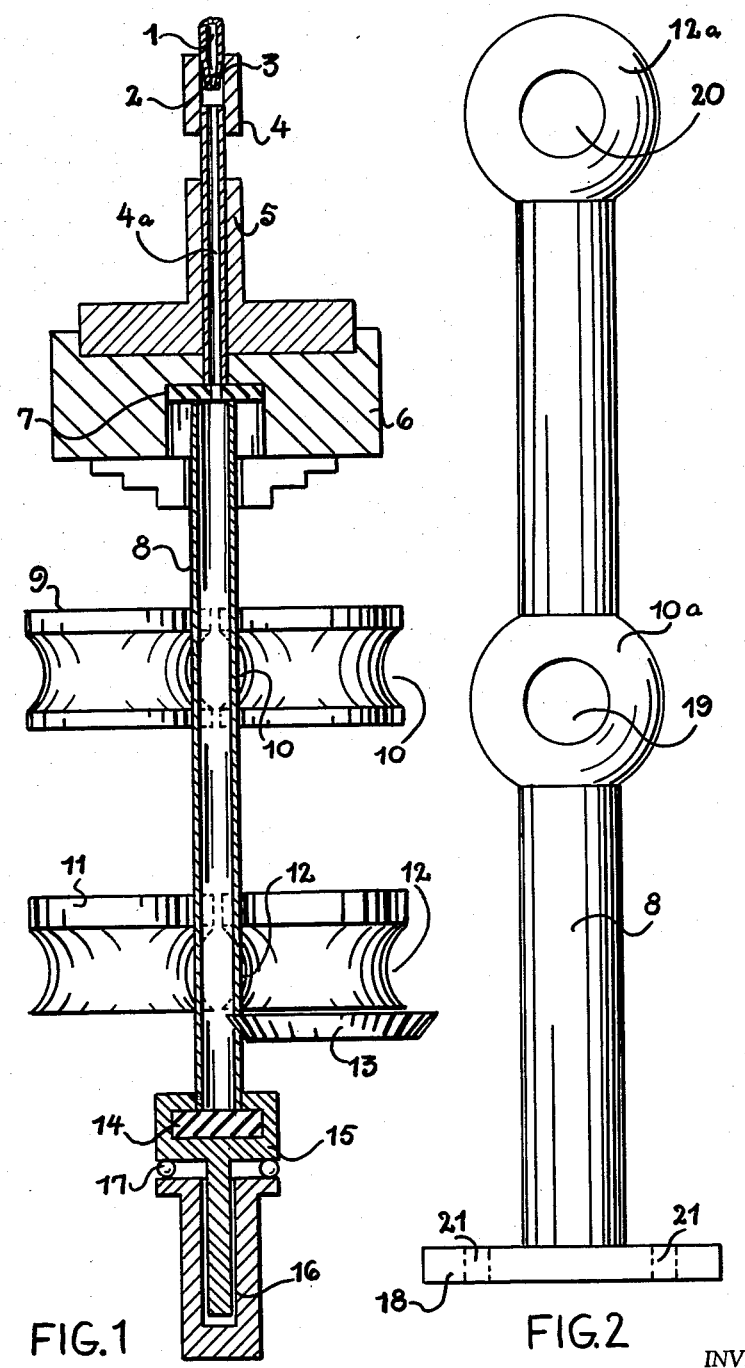

Nov. 23, 1965  R. ESCHERICH  3,218,698
METHOD OF SHAPING HOLLOW METAL ARTICLES BY HEAT
AND INTERNAL PNEUMATIC PRESSURE
Filed Feb. 27, 1962

INVENTOR.
Rudolf Escherich
BY
Peter J. Taylor

3,218,698
METHOD OF SHAPING HOLLOW METAL ARTICLES BY HEAT AND INTERNAL PNEUMATIC PRESSURE

Rudolf Escherich, Bryanston, Transvaal, Republic of South Africa, assignor of fifty percent to Monoweld Engineering Company (Proprietary) Limited, Johannesburg, Transvaal, Republic of South Africa
Filed Feb. 27, 1962, Ser. No. 176,031
Claims priority, application Republic of South Africa, Mar. 2, 1961, 61/837
5 Claims. (Cl. 29—421)

The present invention relates to a method for the shaping of hollow metal articles.

More particularly the invention relates to a method of shaping metal tubes or equivalents by widening at least parts thereof or by the formation of spherical or other protuberances thereon.

An object of the invention is the provision of methods simplifying the shaping of hollow metal articles and the attainment of economies as compared with processes hitherto known for the production of shaped metal articles.

More particularly it is an object of the invention to provide a method and means for producing standards or stanchions for handrails, guardrails or fencerails more economically and more simply than by the processes for their manufacture hitherto known.

Other objects and advantages of the invention will become apparent from the following description.

I have found that hollow metal articles, e.g. tubes can be shaped, e.g. by widening or by the formation of spherical or other protuberances thereon, by heating the said hollow metal articles, at least in the region where they are to be shaped, to a temperature at which the metal becomes readily malleable, forcing in compressed air or other gas suitable for setting up an adequate pneumatic pressure within the hollow article without adversely affecting the material thereof, thereby forcing the wall of the said hollow article outwards in said region against a limiting shaping member, and releasing the pressure before or after cooling.

I have found it particularly advantageous for the said shaping operation to rotate the said hollow article, e.g. the tube to be shaped is rotated about its longitudinal axis and to cause the said tube to rotate against a plurality of pulley wheels, say three pulley wheels, thereby preferably causing them to rotate, said pulley wheels being profiled to the shape desired. The said pulley wheels are preferably distributed uniformly around the tube or the like.

In order to ensure that the walls of the shaped portion or portions have an adequate thickness and strength, pressure is, when required, exercised on the tube or the like in the direction of its longitudinal axis in order to bring fresh material into the region in which shaping is taking place, thereby compensating for the increased surface area produced. In this way, the walls of the shaped portion or portions may be made in any required thickness, e.g. of the same thickness or thinner or thicker than the wall thickness of the rest of the article, and any required degree of uniformity of the thickness is attainable.

Preferably the pressure exercised on the tube or the like in order to supply more material to the regions where shaping is taking place, is a pneumatic pressure, since pressure exerted by means of a gaseous medium has the necessary and desirable elasticity required to force additional material to the aforesaid regions of shaping.

I have found that the invention is applicable with particular advantage to the production of handrail standards, which are also often termed stanchions. These usually consist of tubular members on which spherical or like protuberances are provided at intervals along their height, through which holes are drilled for the reception of the handrail, fencing or guardrail.

Hitherto such handrail standards or stanchions were produced by separately precasting the said spherical or like protuberances with short tubular stub-like sleeves thereon into which latter lengths of tubing for forming the standard or stanchion were inserted, whereupon the said sleeves were pressed onto the tubing.

The production of these precast members is expensive and a considerable number of expensive operations are involved in thus fitting the stanchion or standard together.

I have now found that, in accordance with the present invention, the manufacture of such handrail, fencing or guardrail standards or stanchions is greatly simplified by inserting a metal tube, preferably having a length somewhat greater than the length which the finished standard or stanchion is to have, into a machine, in accordance with the invention, in which the tube can be rotated about its longitudinal axis and in connection with which means are provided for sealing the said tube and forcing compressed air or other suitable gas under pressure thereinto to set up the requisite pressure during the rotation of the tube, the said machine being provided at the points where the spherical or other protuberances are to be formed with a plurality of pulley wheels, say three pulley wheels, uniformly distributed around the said tube with their axes parallel to the longitudinal axis of the said tube, said pulley wheels usually being taken along and rotated by the rotation of the said tube. The pulley wheels are profiled to give the shape of the spherical or other protuberance desired. The tube is now heated in the regions to be shaped, e.g. by a flame of the type generated by a welding torch or other suitable means to a temperature at which the wall of the material in the region to be shaped become sufficiently malleable, the said wall is forced outwards by the compressed air or the like, to form the sphere or other desired shape.

Those parts of the machine which tend to develop heat may be cooled by any suitable means, e.g. by means of water circulating from a supply tank, and through filter means back to the said container tank.

A machine for carrying out the process in accordance with the invention for shaping tubes or other hollow articles preferably comprises a conduit furnishing air or other suitable gas under pressure, a driving rotating connecting member for connecting one end of the tube or other hollow articles to be shaped to the said conduit for compressed air or other suitable gas in sealing connecting relationship, and rotating the said tube or the like, a pressurising device which is adapted to bear against the other end of the said tube or the like for the dual purpose of providing a gas tight seal and providing pressure to force more material to the regions where shaping takes place, and furthermore comprises shaping members, e.g. one or more sets of pulley wheels, ad preferably sets of at least three pulley wheels adapted to be uniformly arranged around the aforesaid tube or the like in the region where shaping is to take place, the pulley wheels being profiled according to the protuberance to be formed, and adapted to be brought into contact with the said tubes or the like when shaping is to take place, and heating means for the purpose of supplying heat to the regions where shaping is to take place.

The said pulleys are usually idler pulleys which are rotated by the rotation of the said tube or the like. The pulleys are brought into position against the said tube or the like for shaping by any suitable means, e.g. by means of a lever system which is preferably pneumatically controlled.

The machine may be controlled in any suitable manner, e.g. by pneumatic means. The actuation of e.g. the pneumatic control means may e.g. be effected by a foot operated mechanism.

Preferably the machine is provided with a suitable spinning member, e.g. a spinning disc, which is so located and disposed that the said disc will cause a separation of the aforesaid tube or other article which has been shaped at the desired point and along the desired line, at the same time closing to a certain extent the end aperture which has thus been formed.

If so desired the forcing outwards of the wall may proceed progressively by progressively advancing the welding torch or like heating means along the region or regions to be shaped.

Preferably the greatest amount of heat is supplied in the region of the largest diameter of the spherical or other protuberance to be formed. Thus, in the case of a spherical protuberance being formed, the heat may advantageously be provided by means of a heating burner provided with a plurality of flames, say three flames, the biggest of which flames is positioned in the centre of the row of flames, which row extends in the longitudinal direction of the tube or the like to be shaped, so that the greatest heat supply will occur in the region of the largest diameter of the said spherical protuberance to be formed. Another type of heater burner that may be employed comprises a plurality of flames extending from the segment of a circle. Any other suitable heating means may also be employed.

Steel tubes are usually heated to dark red heat and the pressure of the compressed gas supply is preferably in the region of 1000 lbs. per square inch, although compressed gas of any other suitable pressure may be employed.

Preferably the pressure is capable of being regulated in accordance with the wall thickness of the tube or the like to be shaped, the pressure being higher with increased thickness of the tube. For example, for a tube or the like with a wall thickness of 12 S.W.G., a pressure in the range of approximately 550 to 650 lbs. per square inch will be adequate to effect the forming of the desired protuberances.

In order to avoid an undesirable thinning of the wall of the hollow body, a pressure is applied against e.g. one end of the tube in the direction of its longitudinal axis to press it together and thus feed further tube material as its wall is pressed outwards. In order to allow the tube or like material to pass more easily into the region in which shaping is taking place, on that side of the pulley wheel from which the pressure is applied on the tube or the like in the direction of its longitudinal axis, a greater clearance is provided, say by 7/1000 inch, between the pulley wheel and the rotating tube than on the other side of the wheel.

The upper spherical or other protuberance which is to be provided at the top of the tube is formed by pressing the tube inwards by a suitable knife member and, if necessary, closing the upper hole that may be left by welding or the like.

Preferably, to this end, the aforesaid tube or the like is initially provided with a circumferential indentation located directly before the region where the upper spherical or other part of enlarged circumference of the standard or stanchion will be formed later, the said circumferential indentation facilitating the closing of the upper spherical or other protuberance formed in the said tube or the like directly below the said indentation by diminishing the size of the upper hole which remains above the upper protuberance. The hole is then closed further by means of a knife member and welding, if necessary. The said indentation is preferably rolled in under a pressure of approximately 50 lbs. per square inch.

Holes transverse to the axis of the standard or stanchion tube for the reception of hand- or guardrails, may be drilled through the said spherical or other parts of enlarged diameter.

In accordance with the invention, the holes for accommodating the rails may also be drilled through the said spherical or other protuberances at any desired angle to the axis of the standard or stanchion to provide standards or stanchions suitable for employment with handrails on stairs or the like. The said standards or stanchions may be inserted into footpieces in known manner. However, if so desired, round footpieces may be shaped onto the base of the said standard or stanchions in accordance with the present invention.

By the process in accordance with the invention, a support frame work for shelving may also be provided, with a number of spherical or other protuberances, with rails inserted therethrough corresponding to the number of shelves that one may wish to insert.

Again, in accordance with the invention, tubular members may be widened to form sleeve-like members thereon by providing pulley wheels in the desired regions, which wheels are provided with a profile to allow of the formation of a sleeve-member having e.g. twice the length desired, the said sleeve member being then sawn through to give two new tube members provided with sleeve members of the desired length. The said sleeve members can, for example, be provided on their interior with a screw thread adapted to receive a screw thread provided on the outer side of the tube.

Also, in accordance with the invention, a bent tubular member of suitable length may be provided with a spherical or other protuberance at one end, produced in accordance with the invention and provided with a hole to contain a rail member, while a base member, adapted to be connected to the vertical beams of a ladder, is provided on the other end of the said bent tubular member, thus constituting the means to provide a ladder or the like with climbing rails.

The hollow metal articles produced in accordance with the invention have spherical or other desired protuberances integral with the said hollow metal articles, which protuberances have any desired or required thickness, e.g. walls of the same thickness as the walls of the said hollow metal articles or, if desired, walls thicker than the walls of the said hollow metal articles, or walls thinner than the walls of the said hollow metal articles when desired or required.

For example, standards or stanchions for guardrails, handrails or fencerails, which comprise tubular members on which spherical or like protuberances are provided at intervals along their height are provided in accordance with the invention in one piece, the walls of the said protuberances having any suitable or desired thickness. The said protuberances are provided with holes at any desired or required angle to the axis of the said standard or stanchion to contain the rail members.

Also, a support frame work for shelving, which comprises tubular vertical posts provided with a number of spherical or other protuberances corresponding to the number of shelves desired, which protuberances are provided with holes for the insertion of transverse rails, is provided in accordance with the invention, the vertical posts being in one piece with the protuberances, which latter have any required or desired wall thickness.

A support member for climbing rails on ladders or the like provided in accordance with the invention, has a bent tubular member terminating in an end spherical or like protuberance integral with the said tubular member, which protuberance has any required or desired wall thickness and is provided with a hole to contain a rail member. A base member, adapted to be connected to the vertical beams of a ladder or the like, is provided on the other end of the said bent tubular member, which may also be integral with the said bent tubular member, or may be connected to the said tubular member in any known manner.

Tube members provided with integral sleeves, in accordance with the invention, may be provided with a screw thread on the interior of the said sleeve to receive an external screw thread provided on another tube member.

The invention will be further described by way of example with reference to the drawings accompanying the provisional specification, in which:

FIG. 1 is a horizontal section, of a means for carrying out the shaping of tubes in accordance with the present invention, and FIG. 2 is an elevation of a handrail stanchion or standard produced in accordance with the present invention.

Referring to FIG. 1 of the drawing, 1 is a stationary conduit leading from a compressor (not shown), furnishing compressed air of approximately 1000 lbs./sq. inch pressure. The said conduit 1 terminates in a brass cone 2 which at 3 is provided with a sealing member (not shown) and which is in sealing relationship with a connecting sleeve 4 rotating, for example, at 250 rotations/min. This rotating connection prevents air from escaping from the connection. Connecting sleeve 4 is connected by conduit 4a with a connecting piece 5 of T-shaped cross section which is screwed against a three jaw chuck 6. The rotating tubular part of connecting piece 5 is supported by ball bearings to follow the rotatory movement of the machine. 7 represents a sealing member, e.g. a combination of a washer and rubber seal to receive the front piece of the front end of tube 8 in a sealing connecting relationship within the chuck 6.

The machine is set for the production of a handrail standard or stanchion, as illustrated in FIG. 2. According to the drawing two sets 9 and 11 of three pulley wheels in each set uniformly distributed around tube 8, are provided, the pulley wheels of sets 9 and 11 being respectively provided with grooves 10 and 12 around their perimeters to provide profiles for the shaping of the spherical protuberances 10a and 12a in the aforesaid standard or stanchion. The said pulley wheels are rotated by the rotation of the tube 8. Sets of four pulley wheels should not usually be employed, since adequate room for the accommodation of the heating means is lacking in that case, although where convenient, they may be employed. The pulley wheels are made of any suitable material, e.g. of case hardened N.E. 36 steel. The pulley wheels, or at any rate one of them, may be brought into position against the tube or the like by means of a suitable lever system, which may be pneumatically controlled. Preferably the position of the pulley wheels is adjustable in longitudinal direction in order to allow for the distance between the spherical or other protuberances which are to be formed to be selected as required. Also the distance of the pulley wheels from a central axis should advantageously be adjustable as desired. At the outer face of at least one of the pulley wheels 11, a spinning knife 13 is provided by means of which the outer opening initially occurring in the formation of sphere 12a is closed at least in part. If any hole remains this may be closed by welding.

The rear end of the tube 8 is sealed gas-tight by the rubber seal 14 in the live centre device 15. 16 is a non-rotating pressurising device which bears against the live centre device 15 by way of the ball bearings 17. The said pressurising device is advantageously operated by pneumatic pressure, say of 100 lbs./sq. inch. The pressure can preferably be regulated in accordance with the amount of additional material required in the region of shaping.

The machine may be cooled by any suitable means in regions where heat tends to develop. For example, the bearings on which the pulleys rotate, the bearings by means of which the non-rotating pressurising device 16 bears against the rotating live centre device 15, and the bearings supporting the connecting piece 5 may advantageously be water cooled by means of water circulating in suitable, usually flexible pipes from a supply tank, to which the water is led back after cooling and, if necessary, after the water has been filtered.

In the operation of the device, the tube 8 while being rotated at, say, 250 rotations per minute, is heated by means of a torch of the type of a welding torch or any other suitable burner or other heating device between the rollers 9, and a compressed air pressure of 1000 lbs./sq. inch is set up. The tube begins to distend outwardly within the grooves 10 and the welding torch is gradually moved backwards until the entire sphere 10a has been formed. At the same time pressure is exercised on the tube 8 on its longitudinal axis by the pressurising device 16 with the object of pushing the tube backwards into the zone in which sphere 10a is being formed in order to supply wall material so that the walls of the sphere do not become thinner than the wall of the tube.

In a preferred embodiment, a stop member is provided between the last set of pulley wheels 11 and the live centre device 15, which stop member is provided with means to vary the distance which the tube can be pushed in the direction of the pulley wheels, e.g. in the form of washer rings with different thicknesses, thus regulating the amount of additional wall material which is supplied to the region where the spheres are formed.

The sphere 12a is similarly formed.

Thus, according to the example, a mild steel tube of about 10 S.W.G. and having an external diameter of 1¾ inches has spheres blown thereon of 2¾ inches external diameter.

Holes 19 and 20 are then drilled through the spheres 10a and 12a respectively for the reception of handrails, guardrails or fencing rails. As shown in FIG. 2 the lower end of tube 8 is inserted into the foot block 18 which is provided with the holes 21.

Masts of all sorts, e.g. telephone, telegraph or street lighting masts, or masts for aerials, e.g. for wireless, telephone, telegraph, or broadcasting or television stations may be produced by the process and/or machines in accordance with the present invention. For example, tapered masts may be produced by blowing out a suitable heated tube against tapered pulley rollers. Again, masts the diameter of which increases towards the bottom along successive lengths may be produced between suitable pulley rollers, the ends of which may be rounded off to give the next stage, and in which new material is pressed in to give equal or even greater wall thicknesses at points of greatest diameter. Thus integral hollow steel masts can be produced of any desired height, say 10 feet, 25 feet, 50 feet or more, having e.g. a top length 2 inches in diameter with a wall thickness of ⅛ of an inch, a middle length having a diameter of 2¾ inches and a wall thickness of ⅛ of an inch and a bottom length of 3½ inches in diameter and ³⁄₁₆ of an inch wall thickness, but the invention is not limited to these dimensions.

The abbreviation S.W.G. employed herein denotes British Standard wire gauge.

What I claim is:

1. A process for shaping hollow metal articles having an elongated axis which comprises
    bringing said hollow article to be shaped, at least in a region where it is to be shaped to a temperature at which the metal becomes readily malleable,
    rotating the said article about its elongate axis during the shaping, and effecting the shaping by setting up an adequate pneumatic pressure within the said hollow article,
    thereby forcing the wall of the body outwards in said region against a limiting shaping member,
    which rotates about its axis in a sense opposite to the sense of rotation of the hollow metal article being shaped.

2. A process for shaping hollow metal articles as claimed in claim 1, in which the hollow metal article is a tubular metal body.

3. A process as claimed in claim 1 which comprises setting up the pneumatic pressure with compressed air.

4. A process for shaping hollow metal articles having an elongate axis which comprises causing the hollow metal article to be shaped to rotate about its elongate axis against a plurality of limiting shaping means, said limiting shaping means being profiled to produce the shape of protuberance desired, heating the said hollow metal article at least in the region where it is to be shaped, to a temperature at which the metal becomes readily malleable, forcing into said hollow metal article a compressed gas suitable for setting up an adequate pneumatic pressure within the hollow article without adversely affecting the material thereof, thereby forcing the wall of the said hollow article outwards in said region against said limiting shaping members which rotate about their axes in a sense opposite to the sense of rotation of the hollow metal article being shaped, and exercising pressure on the said hollow article in the direction of its elongate axis in order to bring fresh material into the region in which shaping is taking place, thereby compensating for the increased surface area produced, and thus ensuring that the walls of the shaped portion have the required adequate thickness and strength.

5. A process for producing stanchions for supporting rail members which comprises rotating a metal tube having a length somewhat greater than the length which the finished stanchion is to have, about its longitudinal axis, causing the said tube to rotate against a plurality of pulley wheels which are profiled to give the shape of the substantially spherical protuberance desired, and which are uniformly distributed around the said tube at the points where shaping is to take place with their axes parallel to the longitudinal axis of the said tube, heating the tube in the region to be shaped to a temperature at which the wall of the material in the region to be shaped becomes sufficiently malleable, forcing suitable compressed gas under pressure into said tube to set up the requisite pressure during the rotation of the tube, so that the said wall is forced outwards by the compressed gas, to form a substantially spherical protuberance, and exercising pressure on the rotating metal tube in the direction of its longitudinal axis in order to bring fresh material into the region in which shaping is taking place, thereby compensating for the increased surface area produced and thus ensuring that the walls of the shaped portion have the required adequate thickness and strength.

References Cited by the Examiner

UNITED STATES PATENTS

| | | | |
|---|---|---|---|
| 1,263,132 | 4/1918 | Sharpe | 189—23 |
| 1,771,220 | 7/1930 | Hench | 189—23 |
| 2,106,495 | 1/1938 | Debor | 29—421 |
| 2,106,496 | 1/1938 | Debor | 29—421 |
| 2,183,304 | 12/1939 | Davis | 72—59 |
| 2,222,762 | 11/1940 | Debor et al. | 29—421 |
| 2,458,854 | 1/1949 | Hull | 72—58 |
| 2,799,084 | 7/1957 | Debor | 29—421 |
| 2,954,604 | 10/1960 | Ramey | 29—421 |

WHITMORE A. WILTZ, *Primary Examiner.*

RICHARD W. COOKE, THOMAS H. EAGER,
*Examiners.*